Dec. 31, 1929.  A. L. LA MONT  1,741,528
VIBRATOR FOR ORE SCREENS
Filed Feb. 10, 1927
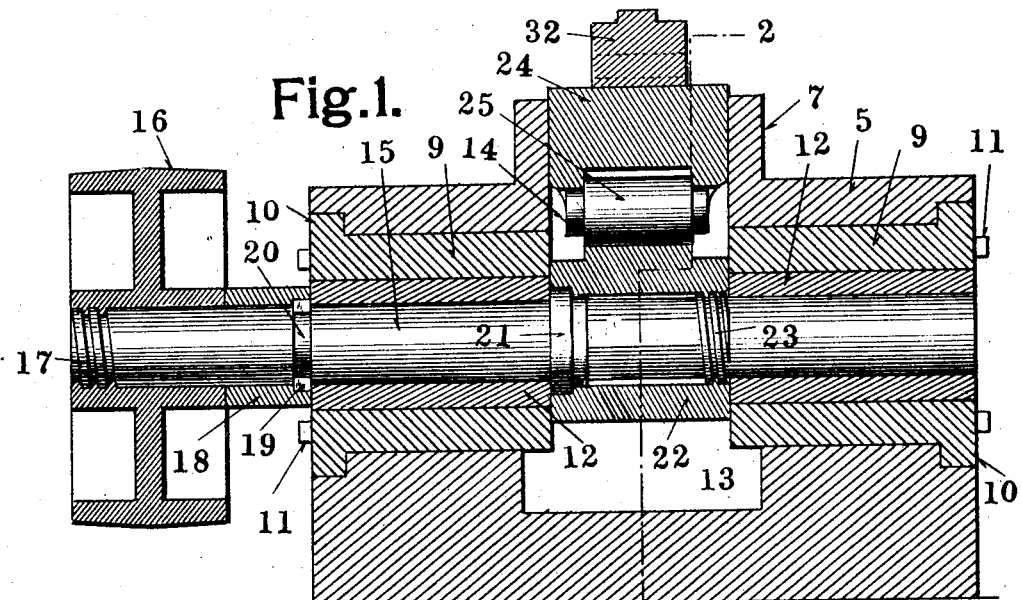
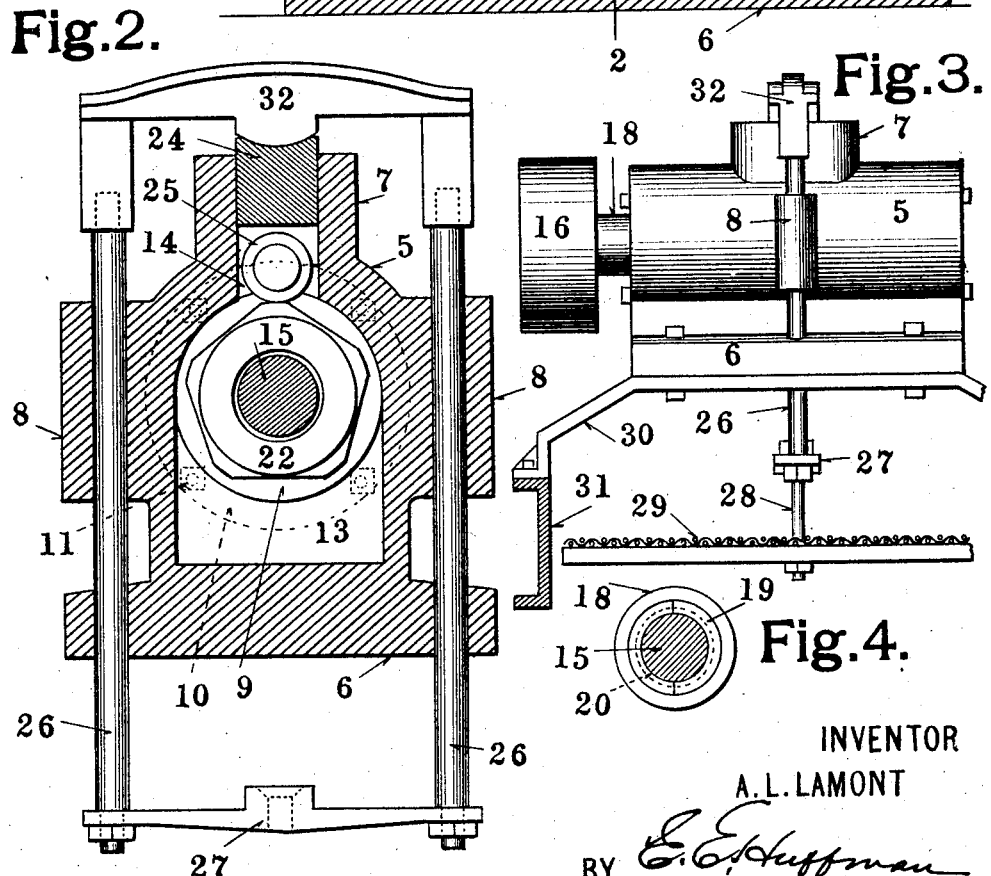
INVENTOR
A. L. LAMONT
BY E. E. Huffman
ATTORNEY Patented Dec. 31, 1929

1,741,528

UNITED STATES PATENT OFFICE

ARTEMUS L. LA MONT, OF FREDERICKTOWN, MISSOURI

VIBRATOR FOR ORE SCREENS

Application filed February 10, 1927. Serial No. 167,104.

My invention relates to a vibrator for ore screens and has for one of its objects the production of a simple and compact device which will be positive in action, thus dispensing with the use of actuating springs. Another object of my invention is to so construct and connect the parts that they will not be liable to be loosened or broken under the intense vibration to which all parts of the machine are subjected during the operation of the device.

In the accompanying drawings, which illustrate one form of vibrator made in accordance with my invention, Figure 1 is a vertical central section taken in the direction of the length of the machine; Figure 2 is a section taken on the line 2—2 of Figure 1; Figure 3 is a side elevation, on a reduced scale, also showing a portion of an ore screen to which the device is applied; and Figure 4 is a section through the driving shaft showing a detail of the split collar.

The body of the machine consists of a casting 5 of cylindrical form provided with a base 6, an upward extension 7 and a pair of guide lugs 8, one at each side of the casting. Formed in the casting 5 is a longitudinal bore for the reception of a pair of bearings 9 each provided with an end flange 10 secured to the casting by bolts 11. The bearings 9 are preferably supplied with a lining 12 of Babbitt or other anti-friction metal. Communicating with and forming an extension of the bore is a lubricant chamber 13 adapted to be supplied with oil through any suitable oil opening (not shown). A guide way 14 in the upward extension 7 also communicates with the central bore.

Journaled in the bearings 9 is the driving shaft 15 on the projecting end of which is mounted the driving pulley 16. Formed on the end of the shaft are threads 17 engaging with corresponding internal threads in the hub of the pulley and the hub bears against a collar 18 surrounding the shaft. The bore of the collar is enlarged at one end so as to enclose a two part ring 19 in a groove 20 in the shaft.

In operating the machine the pulley is driven in the direction which will tend to force it on the shaft through the action of the threads and thus hold it firmly against the collar. The collar by its contact with one end of the adjacent bearing 9 holds the shaft against longitudinal movement in one direction and this shaft is held from movement in the opposite direction by a flange 21 contacting with the other end of the bearing. This flange also forms a support and stop for one end of a cam sleeve 22, the other end of which is provided with internal threads engaging with threads 23 on the shaft. It will be evident that rotation of the shaft in the direction above described will tend to force the cam sleeve against the flange 21 and thus lock the parts firmly together.

Sliding in the guide way 14 is a bifurcated guide block 24 the arms of which rest on the trunnions of a roller 25 in turn resting on the cam face of the sleeve 22. As shown in Figure 2 the face of the cam is so shaped as to actuate the guide block five times to each rotation of the shaft. The shape of the cam may, however, be changed to give more or less vibration for each rotation. Resting on the upper face of the guide block 24 is a yoke 32 from which connecting rods 26 extend downwardly through the guide lugs 8 and the base 6 to a cross bar 27 which is connected by any suitable means, such as bolt 28 with the screen 29. The vibrator is supported on a bridge piece 30 carried by the screen frame 31.

Having fully described my invention, what I claim as new and desire to secure by Letters Patent of the United States is:

1. In a device of the class described, the combination with a casing, of a bearing in said casing, a driving shaft journaled in said bearing, a groove in said shaft at one end of said bearing, a split ring in said groove, a collar on said shaft and surrounding said ring, a pulley threaded on said shaft and bearing against said collar, a flange on said shaft at the other end of said bearing, a cam sleeve threaded on said shaft and bearing against the flange, and connections operated from said sleeve.

2. In a device of the class described, the combination with a casing provided with an upward extension and a pair of side lugs, of a driving shaft journaled in said casing, a cam on said shaft, a guide block sliding in said upward extension and actuated from said cam, a yoke bearing on said guide block, and a pair of connecting rods carried by said yoke and sliding in said lugs.

3. In a device of the class described, the combination with a casing provided with an upward extension and a pair of side lugs, of a pair of bearing blocks removably secured in said casing, a driving shaft journaled in said bearing blocks, a groove in said shaft at one end of one of said bearing blocks, a split ring in said groove, a collar on said shaft and surrounding said ring, a driving pulley threaded on said shaft and bearing against said collar, a flange on said shaft between said bearing blocks, a cam sleeve threaded on said shaft and bearing against said flange, a guide block sliding in said upward extension, a roller interposed between said cam sleeve and guide block, a yoke supported on said guide block, and a pair of connecting rods carried by said yoke and sliding in said side lugs.

In testimony whereof, I hereunto affix my signature, this 7 day of February, 1927.

ARTEMUS L. LA MONT.